United States Patent [19]

Valentine

[11] 4,006,537
[45] Feb. 8, 1977

[54] EDUCATIONAL DEVICE FOR LEARNING ROTARY ENGINE FUNDAMENTALS

[75] Inventor: Charles G. Valentine, Stamford, Conn.

[73] Assignee: Xerox Corporation, Stamford, Conn.

[22] Filed: July 27, 1973

[21] Appl. No.: 383,358

Related U.S. Application Data

[63] Continuation-in-part of Ser. No. 345,920, March 29, 1973, abandoned.

[52] U.S. Cl. .................................... 35/13; 35/7 A; 40/142 A
[51] Int. Cl.² ........................................ G09B 25/02
[58] Field of Search ............. 35/8 R, 8 A, 9 R, 9 A, 35/9 B, 10, 11, 13, 19 R, 19 A, 28, 31 R, 48 R, 60, 73; 40/142 A

[56] References Cited

UNITED STATES PATENTS

| | | | |
|---|---|---|---|
| 1,270,369 | 6/1918 | Bishop | 35/13 |
| 2,269,035 | 1/1942 | Neal | 35/13 |
| 2,867,045 | 1/1959 | Millgate | 35/60 |
| 3,077,696 | 2/1963 | Barnett et al. | 35/19 A X |
| 3,245,156 | 4/1966 | De Bloois et al. | 35/8 A |
| 3,423,846 | 1/1969 | Arend | 35/19 A |
| 3,514,873 | 6/1970 | Stobbe | 40/142 A X |
| 3,651,592 | 3/1972 | McCormick | 40/142 A |

OTHER PUBLICATIONS

*The Way Things Work;* Simon & Schuster, New York, 1967, pp. 472–473.

*Primary Examiner*—Anton O. Oechsle
*Assistant Examiner*—Vance Y. Hum

[57] ABSTRACT

An educational kit for teaching the operation and mechanism of an internal combustion rotary engine is disclosed. The kit comprises an audiovisual instructional system, a simulator board upon which is graphically depicted indicia representing a schematic diagram of a rotary engine housing and a schematic diagram of a rotary engine rotor, and a plurality of manipulative pieces upon which are graphically depicted schematic diagrams of various internal parts of a rotary engine, or work indicia naming various parts or describing engine operation. The pieces are adapted to be positioned on the simulator board such that the user of the kit may graphically depict the assembly, relationship of parts, and operation of an internal combustion rotary engine.

4 Claims, 7 Drawing Figures

AUDIO VISUAL MEANS

WORK SHEETS

EDUCATIONAL DEVICE FOR LEARNING ROTARY ENGINE FUNDAMENTALS

This application is a Continuation-In-Part of applicant's copending application Ser. No. 345,920, filed Mar. 29, 1973, now abandoned.

BACKGROUND OF THE INVENTION

The present invention relates to a portable, compact and easily assembled educational kit. More specifically, the present invention is directed towards an educational kit for teaching the assembly, relationship of parts and operation of an internal combustion rotary engine comprising as the essential components thereof an audiovisual instructional means, a simulator board bearing graphic indicia thereon, and a plurality of manipulative pieces bearing graphic indicia thereon, which indicia is relatable to the indicia present on the simulator board such that the student can demonstrate his understanding of the fundamentals of the rotary engine by arranging certain of the manipulative pieces on the board in a logical sequence.

A problem of increasing difficulty in the education field is that of providing a relatively simple means for instructing students, whether in the classical elementary or high school subjects, or in the various occupational technologies. The effectiveness of the traditional method of teaching involving the teacher/textbook/student relationship is measured not so much by the qualitative aspects of the information conveyed, but rather by how much of the information conveyed is absorbed, understood and learned by the particular student. In recent years the trend in education has witnessed the introduction of a number of educational teaching devices generally aimed at the pre-college or pre-high school age group. The most common of these devices are the mechanical or computer devices designed to be used by individual students. The theory behind the increasing use of such devices is that account is made of the individual differences in ability, speed and grasp of subject matter, thereby permitting the student to learn at his own pace and with minimum supervision by the teacher. Some of these devices, such as the video computer type devices, are designed to take over a substantial part of the responsibility for providing and transmitting basic information. Others are designed simply to supplement the teacher's own instructional materials by introducing new dimensions into the learning process whereby, for example, spelling may be associated with pictures of objects, mathematical concepts associated with relative sizes and shapes of objects, or correct responses to questions posed by a computer type device rewarded by permission to proceed.

The advantages of a teaching method using a device geared for the individual whereby both the teacher and the individual may be appraised of the individual's progress are not restricted to the traditional elementary or high school subjects; occupational learning materials that take into account individual differences in ability, speed and grasp of subject matter also have a better chance of being effective. However, at the present time, there are very few educational devices available in the community colleges, the junior colleges, the vocational high schools, the trade schools and other special schools where various types of occupational technologies are sought to be taught on a simplified and individualized basis.

Accordingly, it is an object of this invention to provide programmed educational kits which present information using a multimedia approach.

Another object is to provide an educational kit comprising instructional means and simulator means for teaching the assembly, relationship of parts and operation of an internal combustion rotary engine.

Another object is to provide an educational kit which is simple, relatively inexpensive, rugged, easily assembled, relatively portable and easily understood.

Another object is to provide an educational kit designed for use by individual students comprising audio, visual or audiovisual instructional means, a simulator board bearing graphic indicia, and a plurality of manipulative pieces bearing graphic indicia depicting schematic diagrams of various internal parts of a rotary engine, or word indicia naming various parts or describing engine operation, whereby the student may position the pieces at the appropriate indicia present on the simulator board in response to the instructional means to graphically depict the operation of the engine as well as identify the various parts and describe the various stages of engine operation.

SUMMARY OF THE INVENTION

In accordance with the objects and teachings of the present invention, a simple and effective educational kit or unit for the teaching of the rotary or "Wankel" engine is provided. The unit comprises an instructional means, a simulator board upon which is graphically depicted indicia representing a schematic view of a rotary engine housing and rotor, and a plurality of pieces upon which are graphically depicted schematic diagram of various engine component parts or certain descriptive word indicia. The kit may also comprise a display board which provides for storage and easy access to the various pieces when the kit is in use. The kit is designed to present the fundamentals of the rotary engine whereby the student learns the assembly, relationship of parts and operation of a rotary engine. This information is conveyed to the student using a programmed multimedia approach whereby the student hears and sees information, performs by answering questions, solving problems and manipulating objects. The kit is designed for individual use or for use by small groups without the need for extensive supervision or participation by an instructor. It permits the student to learn at his own pace and also affords him the chance to capitalize on the way he learns best because he participates in different kinds of learning experiences. He listens to information while viewing a series of related visuals and participates in a manipulative activity which gives him the chance to try doing himself what he has been shown or told how to do. Each time a student learns something new, he responds to this new knowledge or skill to make sure he has learned it correctly. First, he performs an activity such as answering a question, solving a problem or manipulating a device. Then he finds out immediately if the action is correct by comparing the result of this action with the one provided by the program. If the student finds that his answer is correct, this instant feedback and learning reinforcement motivates him to continue learning. If he discovers that his answer is wrong or inadequate, he can stop at that point and find out where his error is.

DETAILED DESCRIPTION OF THE INVENTION

Various kinds of instructional means can be employed with the educational kit of this invention. For example, one of the preferred instruction means is an audiovisual presentation using slides or filmstrips in conjunction with a descriptive audio account of the visuals, presented by means of tapes or audio cassettes. A recorded narrator provides background information relating the rotary engine including the parts thereof, how the engine operates, how it compares with the piston engine, advantages and disadvantages, and the like. During this audio presentation, a series of synchronized related visuals are shown to the students. These visuals comprise photographs or diagrams of the various rotary engine parts and how they are assembled, as well as diagrams of the engine during various phases of operation.

The audiovisual equipment needed will vary depending on the type of instruction to be given. A rear screen projector for small groups, or a projector and screen for a classroom presentation may be used. For the audio presentation, either visual projection equipment with built-in audio capability or a separate cassette recorder may be used. The instructional means provided with the educational kit includes a visual segment available, for example, on 35 mm slides or filmstrips, and an audio segment available on cassettes. The supporting equipment is normally not included with the kit.

At various points during the presentation, the student is requested to stop the audiovisual presentation and perform certain activities using the simulator board and pieces associated therewith. For example, he may be requested to position a piece depicting the engine rotor within the rotor housing and manipulate the rotor within the housing to depict its position during various stages of operation, or label those areas within the housing where intake, compression, ignition and exhaust are taking place. The simulator activity thus allows the student to use his hands as a learning tool, as well as his eyes and ears. By performing an activity using the simulator board and its accessories, the learning process is reinforced and the student takes an active part in learning and achieves understanding more quickly.

The simulator board and the accessories are best described with reference to the attached drawings.

DETAILED DESCRIPTION OF THE DRAWINGS

Figure 1:
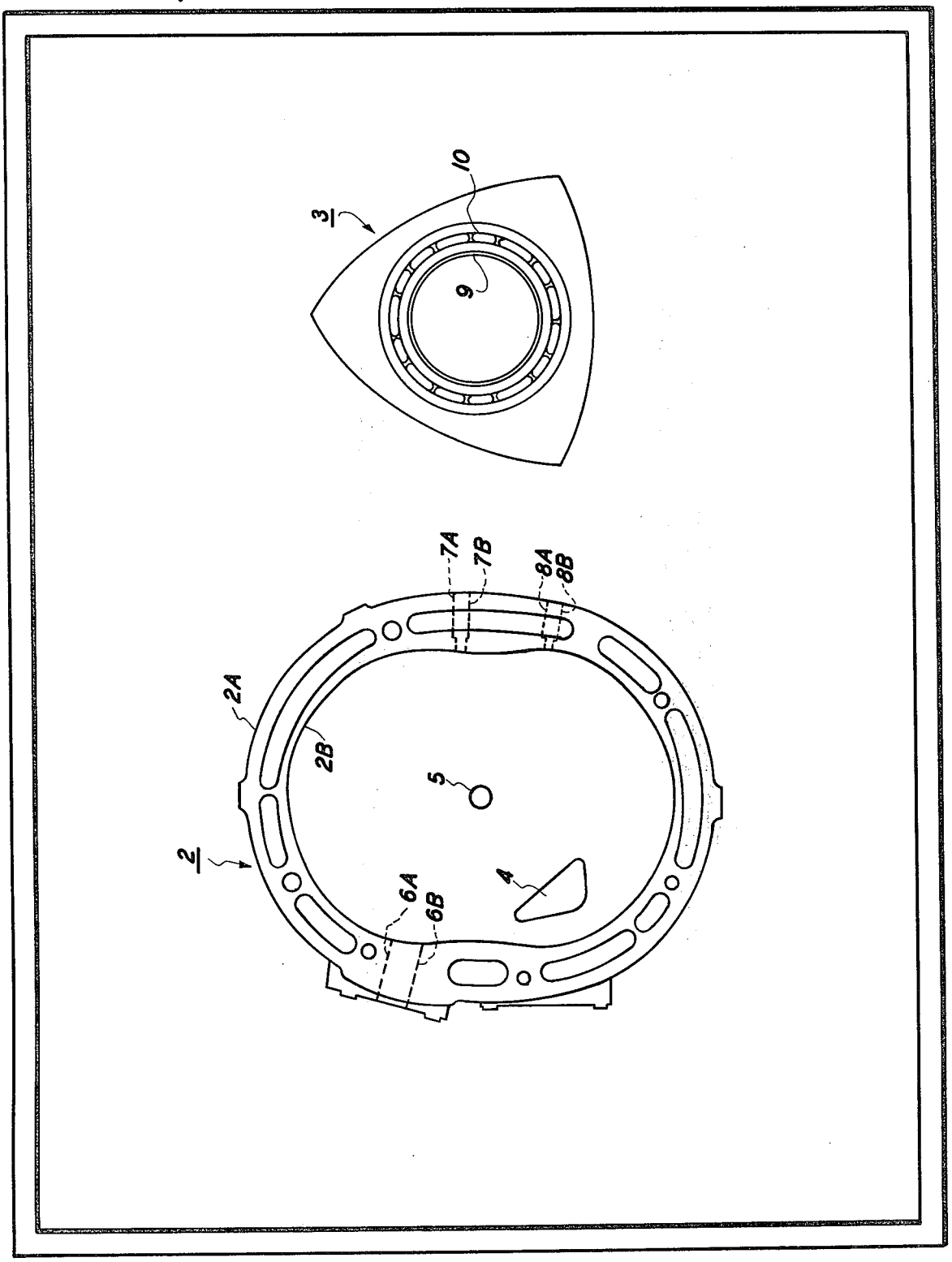
FIG. 1 is a plan view of the simulator board with graphic indicia thereon.

In FIG. 1, the simulator board 1 is shown having printed thereon graphic indicia depicting a side view of a rotary engine housing 2 defined by lines 2A and 2B on the left side of the board and a rotor 3 on the right side of the board. The rotor housing also includes the rear end housing plate of the engine wherein the fuel intake oraface is depicted at 4 and the opening for the main shaft is shown at 5. Also shown within housing 2 are the exhaust port represented by dotted lines 6A and 6B and locations for two spark plugs represented by dotted lines 7A and 7B, 8A and 8B. Within rotor 3 are shown collar bearing 9 whereby the rotor is mounted on the main shaft and simulated gear teeth 10 which are adapted for meshing with stationary gears present on the end housings of the engine. These diagrams serve as locations for positioning the manipulative pieces in order to simulate the assembly and operation of the rotary engine, as will be hereinafter described.

The simulator board may be constructed of a magnetically attractive sheet of rigid material such as ferrous metal or a magnetic ferrite plastic, or a thin sheet of ferrous metal coated with a thin layer of plastic material. The surface of the board is painted with a neutral background color such as a white or yellow enamel. The graphic indicia present on the board may be printed over the enamel in a suitably contrasting color such as black. Printing may be accomplished by any suitable means such as, for example, a silk screening process. Alternatively, the indicia may be printed on a sheet of clear plastic adapted to be superimposed over a blank board. Although the simulator board may consist solely of a thin sheet of metal with suitably smooth edges, the metallic sheet may also be laminated to a suitable backing member which imparts suitable rigidity thereto. Thus, the simulator board may comprise a thin sheet comprising ferrous metal having a thickness of about 1/32 inch laminated to a backing member made from a rigid material such as Masonite, fiberboard, or a resinous material, said backing material having a preferred thickness of about ¼ inch. The dimensions of the simulator board should be such that the board can be conveniently used by the student at a given workplace. Boards having dimensions of about 15 × 20 inches, or approximately 300 square inches, are particularly suitable.

Figure 2:
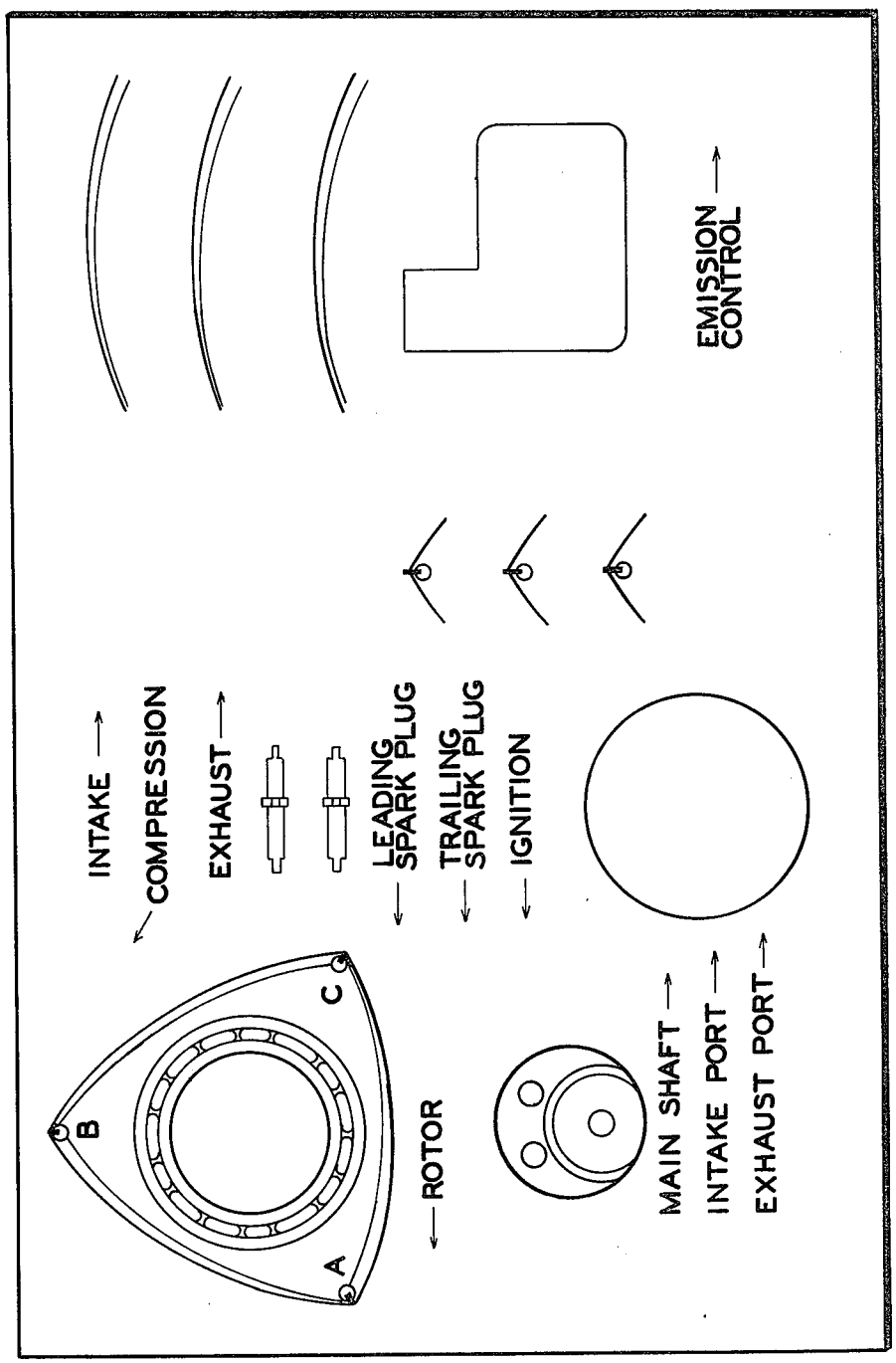
FIG. 2 is a plan view of the display board with graphic indicia thereon.

In FIG. 2 a display board is shown having printed thereon graphic indicia depicting various internal parts of a rotary engine and certain descriptive word indicia. The display board is also constructed on a magnetically attractive material similar to the simulator board and the background indicia may be printed thereon in the same way. The purpose of the display board is to serve as a display and storage are for the magnetically attractive pieces which are used in conjunction with the simulator board. Each of the graphic indicia printed on the display board corresponds to the indicia printed on one of the pieces, thereby facilitating systematic storage and display of the pieces and allowing for quick inspection to determine that all of the pieces are accounted for. The edges of the board should be either smooth or rolled over to prevent injury from sharp edges.

Figure 3:
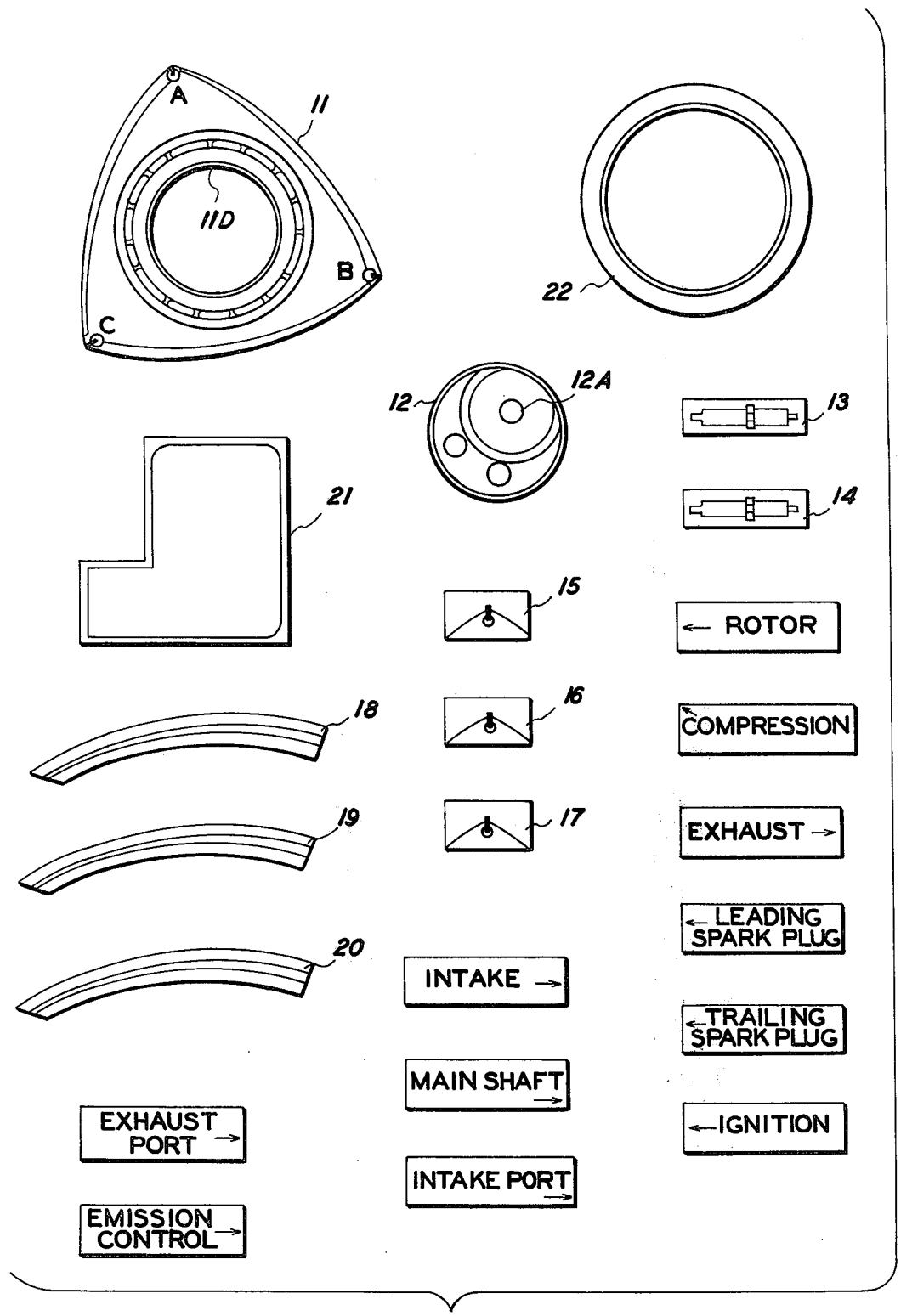
FIG. 3 is a plan view of the manipulative pieces having graphic indicia thereon.

The manipulative pieces used in the educational kit of this invention are shown in FIG. 3. Each of these is made of a flat sheet of a rigid material such as metal or plastic and has laminated to the underside thereof smaller pieces of a magnetically attractive material such as metal or ferrite plastic. The preferred thickness of the pieces is approximately 1/16 of an inch and the thickness of a smaller section laminated to the underside of the pieces is about 3/32 of an inch.

As shown in FIG. 3, some of the pieces bear indicia depicting a schematic diagram of various of the component parts of the rotary engine and other of the pieces bear word indicia. Piece 11 depicts a rotor for a rotary engine similar to that shown on the right side of the simulator board. A central hole defined by line 11-D is adapted to accomodate piece 12. The three apices of the rotor bear lettering indicia "A," "B," and "c." Also included in piece 11 are three apex/corner seals located at each apex and three side seals running between each apex. Piece 12 depicts a side view of the main rotor shaft with true center of the shaft shown at 12-A. Pieces 13 and 14 depict spark plugs, pieces 15, 16 and 17 depict apex/corner seals, pieces 18, 19, and 20 depict side seals, piece 21 depicts an emission control device and piece 22 depicts an oil seal. Also shown are a plurality of pieces bearing descriptive word indicia naming the various engine parts or describing engine operation.

Pieces 15–20 and 22 are adapted to be used in conjunction with rotor indicia 3 present on the right side of simulator board 1 in order to graphically illustrate the assembly of parts present in the rotor mechanism; the remaining pieces are adapted to be used in conjunction with indicia 2 present on the left side of the board such that the operation of the rotary engine may be simulated by proper positioning and manipulation of these pieces according to the instruction given via the instructional means. For example, rotor 11 is adapted for positioning in the interior section of the rotor housing 2 present on board 1 such that the three apices touch inner wall 2B of the housing. By rotating rotor 11 within the housing such that the apices are at all times in contact with inner wall 2B, the student is able to simulate the operation of the engine. As the rotor turns, chambers of varying size are created in the areas defined by inner wall 2B and arcs AB, AC and BC of rotor 11. The student can further describe what's happening in these various chambers at any given time using the labels designating "Intake," "Compression," "Ignition" or "Exhaust." Other engine parts or sequences of operation may be similarly designated.

Figure 4:
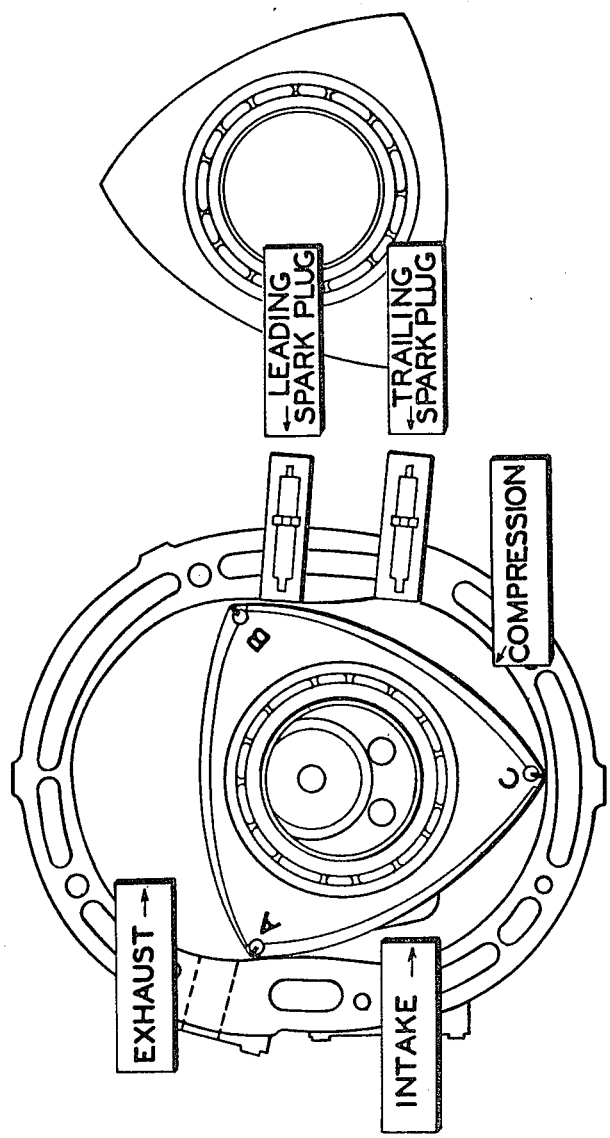
FIG. 4 is a plan view of the simulator board with certain of the manipulative pieces in place.
Figure 5:
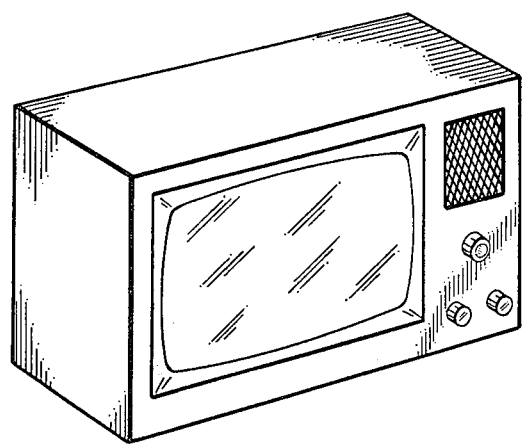
FIG. 5 illustrates generally an audiovisual device suitable for use in the present invention.
Figure 6:
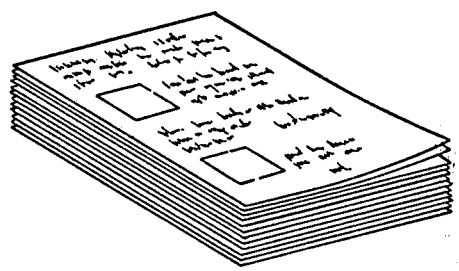
FIG. 6 illustrates generally worksheets in accordance with the present invention.
Figure 7:
FIG. 7 is a side-sectioned view of a typical manipulative piece in accordance with the invention showing smaller magnetic sections laminated to the underside of the piece.

In FIG. 4, the left side of the simulator board is shown with certain of the manipulative pieces in place. The Figure exemplifies how certain of the pieces may be positioned to simulate the rotary engine just prior to ignition.

As indicated above, the surfaces of the simulator board, the display board and at least the bases of the manipulative pieces are made from or contain a magnetically attractive material. The term magnetically attractive material is intended to encompass a material that is either itself magnetic or a material that is attracted to a magnet. Thus, there the surface of the boards is magnetic, the bases of the pieces need only be of a material that is attracted to a magnet. In the simpler and preferred embodiment, the bases of the pieces have laminated thereto a section of a magnetic material such as magnetic plastic or metal, and the boards are made of material that is attractive to a magnet such as galvanized steel.

All of the above materials are most conveniently supplied housed in a compartmentalized case for easy use and storage. Thus, the educational kit includes the simulator board, the display board, the manipulative pieces, the visual slides or tapes and the audio cassette. The kit may also include student work sheets, sample tests or quizzes to be given by the instructor before and after use of the unit, and an instructor's manual.

To illustrate how the educational kit of the present invention is used, the audiovisual presentation begins with a brief discussion about the history of the development of internal combustion engines up to the development of the rotary engine by Dr. Felix Wankel. The advantages of the rotary engine as compared with the piston engine are explored and the student is informed that the two prime advantages are the smaller size of the rotary engine and also the fewer mechanical parts involved. This material is presented to the student by means of the visual slides and audio presentation. The discussion then focuses on the construction of the rotary engine and includes a discussion of the main component parts thereof such as the rotor, the rotor housing, the end housings, the main shaft, and how these various components are assembled. At this point the student is requested to turn to the simulator board and the pieces associated therewith as an aid in understanding precisely how the rotary engine is constructed and how it operates. The student is first instructed to place piece 11 representing the rotor within the confines of the rotor housing shown at 2 on the simulator board such that each apex of the rotor is in contact with inner wall 2B of the rotor housing. By rotating the rotor within the housing in a counter clockwise direction with each apex of the rotor at all times contacting inner wall 2B of the rotor housing the student is able to simulate the precise path of the rotor during one complete revolution.

The construction of the main shaft is next discussed and the student is instructed by means of visual diagrams and audio information on how the rotor is mounted on the main shaft and how the rotary motion of the rotor inparts rotary motion to the main shaft. The student is instructed that the rotor is mounted in an eccentric fashion on the main shaft on large off-center rounds which are called lobes. The student is shown how one complete rotation of the rotor results in three complete rotations of the main shaft. The student may then simulate this activity by placing piece 12 representing the main shaft on the simulator board and within the confines of the central hole defined by line 11D present in rotor piece 11. The piece is positioned such that the main shaft center 12A coincides with the main shaft openings shown at 5 on the simulator board. By rotating both rotor 11 and main shaft 12 within the rotor housing, the student is thus able to simulate the method by which the rotor imparts rotary motion to the main shaft and show how one complete rotation of the rotor results in three complete rotations of the main shaft.

The instructional material then deals with the ways in which intake, compression, ignition, combustion, and exhaust occur in a rotary engine. By rotating rotor 11 within the rotor chamber present on the simulator board the student is able to visualize the creation of various chambers within the engine formed in the spaces between the edges of the rotor and the walls of the chamber as the rotor rotates. For example, when the rotor is positioned such that the B apex is at 3 o'clock the chamber formed by arc AB and the rotor wall is in a state of combustion while the chamber formed by arc BC and the engine wall would be in a state of compression. When the rotor is rotated within the chamber in a counter clockwise direction such that apex B is facing 2 o'clock position, the chamber formed by arc AB and the engine wall is in a state of exhaust, the chamber formed by arc BC and the engine wall is in a state of compression just prior to ignition, and the chamber formed by arc AC and the engine wall is in a state of fuel intake. This is the particular position which is depicted and labeled in FIG. 4. As he simulates the operation of the engine, the student may also employ the manipulative labels to designate particular phases of the engine operation or to name particular parts. For example, fuel intake port 4 can be designated using the label INTAKE PORT, "COMPRESSION, EXHAUST, AND IGNITION. The two pieces designated 13 and 14 which depict spark plugs are adapted to be positioned at dotted line 7A and 7B, 8A and 8B, and these plugs can be appropriately labeled. Similarly, piece 21 which represents an emission control device is adapted for positioning alongside the exhaust port which is designated by dotted lines 6A and 6B, and this device may also be labeled by choosing the appropriate manipulative piece.

The instructional material next deals with the construction of the rotor which is used to drive the rotary engine. The student is informed that since three of the four states of a combustion cycle occur simultaneously in the three combustion chambers in a rotary engine, it is essential that the three chambers be completely sealed from each other. The various types of seals which are used in conjunction with the rotor are discussed, such as the apex seal, the corner seal, the oil seals, and the side seals. The construction of each of these sealing members in discussed and the relative location of these seals with regard to the rotor is depicted diagrammatically. The student is able to construct a rotor with the seals in place by proper positioning of the apex/corner seals represented by pieces 15, 16 and 17, the side seals represented by pieces 18, 19 and 20 and the oil seal represented by piece 22 at the appropriate locations on the rotor depicted at 3 on the simulator board.

The above described educational kit is programmed such that the student will encounter a minimum of frustration and a maximum of learning efficiency during use of the kit. Upon completion of the kit, the student should be able to recognize and name the various components of a rotary engine such as the rotor, the front end housing, the rotor housing, the rear end housing, the main shaft, the intake port, the exhaust port, apex and corner seals, side seals, the oil seal. He should be able to indicate where the apex, corner, side and oil seals are installed on a rotor, describe the similarities and differences of operation of the rotary engine and a conventional reciprocating engine as they move through a four-stroke cycle, define eccentricity and state how this term applies to the rotor and the main shaft, compare a conventional V-8 engine with a typical two-rotor automotive engine in terms of size, total number of parts, and number of moving parts, state at least three advantages which the rotary engine has over a conventional reciprocating engine, and the like.

A complete description of the educational kit encompassed by the present invention may be found in a booklet entitled "Automotive Technology — Rotary Engine Fundamentals" (Unit 10249-80) published as part of the Occupational Technology Series by the Xerox Corporation.

What is claimed is:

1. An educational kit programmed for teaching the assembly, relationship of parts and operation of an internal combustion rotary engine comprising in combination:
   a. a simulator board having a surface of magnetically attractive material and having specific graphic indicia on the surface thereof, said graphic indicia including on one area of said board a schematic sectional view of a rotary engine housing, including inner and outer wall portions, and at another area of said board a schematic view of a rotary engine rotor, the indicia on said simulator board being as shown by the non-numerical indicia of FIG. 1;
   b. a plurality of magnetically attractive manipulative pieces individually bearing on their surfaces graphic indicia defining diagrams of parts of said rotary engine and another plurality of pieces bearing word indicia naming the various engine parts or defining cycles of engine operation, said pieces including a piece bearing indicia defining a rotary engine rotor with each rotor apex designated, said piece being of a size and shape such that it may be positioned and rotated within the confines of the inner wall portion of said rotary engine housing with each apex touching said inner wall portion, said pieces also including pieces bearing indicia defining rotor seals of size and shape such that they may be positioned in association with the rotor depicted on said simulator board to simulate the construction of rotor apex, corner and side seals, the indicia on said pieces being as shown by the non-numerical indicia of FIG. 3;
   c. a display board for said manipulative pieces including a sheet of magnetically attractive material, said display board having graphic indicia on a surface thereof in spaced relationship, said graphic indicia corresponding to the indicia present on each of said manipulative pieces, said manipulative pieces adapted for storage on and removal from said display board; and
   d. audiovisual instructional means including synchronized recordings and visual slides or filmstrips presenting information relevant to the construction and operation of the internal combustion rotary engine including information defining the interrelationship between the indicia on said pieces and the indicia on said simulator board, said audiovisual instructional means further characterized in that it is periodically stoppable to permit the user to perform a manipulative activity requested by the instructional means using said simulator board and said manipulative pieces, and being restartable by the user upon completion of the activity; whereby the assembly, relationship of parts and operation of an internal combustion rotary engine may be simulated by positioning and manipulating said pieces on said simulator board in response to said instructional means.

2. An educational kit according to claim 1 wherein said manipulative pieces are magnetic.

3. An educational kit according to claim 2 wherein said manipulative pieces comprise a flat sheet of rigid material having smaller sections of a magnetic material laminated thereto.

4. An educational kit according to claim 1 wherein said instruction means includes a plurality of student work sheets, said work sheets being adapted for use by the student to record information and test the student in response to said audiovisual instruction means.

* * * * *